3,639,492
DEHYDROHALOGENATION OF HALOGENATED COMPOUNDS

John B. Campbell, Hockessin, Del., assignor to E. I. du Pont de Nemours and Company, Wilmington, Del.
No Drawing. Filed Feb. 28, 1968, Ser. No. 708,801
Int. Cl. C07c 21/02, 21/20
U.S. Cl. 260—655      8 Claims

ABSTRACT OF THE DISCLOSURE

Halogen-containing organic compounds are treated with aqueous inorganic alkaline materials in the presence of a catalytic amount of a sulfonium compound to split off hydrogen halide.

BACKGROUND OF THE INVENTION

It is known to dehydrohalogenate halogen-containing compounds by reacting with aqueous alkali. Chloroprene (2-chloro-1,3-butadiene) can conventionally be prepared by dehydrochlorinating 3,4 - dichloro - 1 - butene with aqueous alkaline solution such as aqueous sodium hydroxide or potassium hydroxide. Such a procedure is disclosed in U.S. Pat. 2,430,016. However, these processes are characterized by relatively low reaction rates and there has been a need for a dehydrohalogenation process with a much faster reaction rate than has heretofore been available.

DESCRIPTION OF THE INVENTION

In accordance with this invention there is provided an improvement in the aqueous process for dehydrohalogenating halogenated aliphatic hydrocarbons containing at least two carbon atoms and at least one hydrogen atom. The process involves conducting the dehydrohalogenation by reaction with an inorganic alkaline material in aqueous medium in the presence of a catalytic amount of a sulfonium compound. Usually the amount of sulfonium compound will be about 0.5–15% by weight based on the weight of the halogenated compound which is being dehydrohalogenated; 1 to 10% is the preferred amount of sulfonium compound. By operating in accordance with the present invention very substantial increases in reaction rate are obtained as well as a reduction in the percentage of the unwanted by-products which are normally produced in aqueous dehydrohalogenation reactions, such as 1-chloro-1,3-butadiene when 3,4-dichloro-1-butene is the halogenated compound.

The sulfonium compound that can be used in practicing the invention process have the following general structure:

RR′R″S+X− wherein the various R's are organic radicals and X− is an anion. The organic radicals can be aliphatic or aromatic although it is preferred that no more than two aromatic radicals should be directly attached to the sulfur atom. Two of the R groups can together form a ring. The aliphatic radicals can be saturated or unsaturated, cyclic or acyclic. They can be substituted with aromatic rings. The various R groups can be substituted with non-hydrocarbon groups such as hydroxy, alkoxy, carboxy, etc. It is preferred that the compound contain at least one aliphatic chain containing eight or more carbon atoms.

The anion X− can be any anion which does not interfere with the reaction and does not promote polymerization (if the product is polymerizable, as in the case of chloroprene). Examples include chloride, iodide, bromide, and the methyl sulfate ion.

Examples of suitable sulfonium compounds which can be utilized to practice the invention process include the following:

trimethylsulfonium iodide
dihexylmethylsulfonium iodide
dodecylethylmethylsulfonium chloride
hexadecyldihexylsulfonium iodide
methyldioctadecylsulfonium iodide
trihexadecylsulfonium iodide
dodecyl(2-hydroxyethyl)methylsulfonium iodide
(p-dodecylbenzyl)bis(2-hydroxyethyl)sulfonium chloride
dimethylcyclohexylsulfonium iodide
dicyclohexylmethylsulfonium iodide
diisooctylmethylsulfonium methyl sulfate
dodecylbenzylmethylsulfonium methyl sulfate
cetyl-o-tolylmethylsulfonium methyl sulfate
dodecyltetrahydrothiapyrilium iodide
cetyltetrahydrothiophenium iodide
1,6-hexamethylenebis(dimethylsulfonium bromide)

The preparation of various sulfonium compounds which may also be utilized is found in Reid, Organic Chemistry of Bivalent Sulfur, Vol. II, pp. 66–75, 1960; U.S. Pat. 2,-794,026, French Pat. 810,437 and British Pat. 754,884.

The preparatory methods of the preceding references can be adapted to the preparation of sulfonium compounds from other known starting materials such as the sulfides and alkyl halides.

Mixtures of more than one sulfonium compound can be used. The use of crude reaction mixtures without isolation of pure compounds is satisfactory.

The temperature to be used in carrying out the process of this invention can vary from about 0° C. to at least about 100° C. At temperatures below about 0° C. the reaction is undesirably slow and temperatures substantially above 100° C. are undesirable because of increased problems of polymerization and by-product formation. The most practical temperature range is from about 10° C. to about 50° C. when 3,4-dichloro-1-butene is being dehydrohalogenated to chloroprene. It is most convenient to use the autogenous pressures which develop normally under the reaction conditions. Higher or lower pressures may be used if desired.

The reaction is carried out in the absence of oxygen to avoid subsequent reactions of the dehydrohalogenated product formed. Also, it is highly desirable to add polymerization inhibitors such as phenothiazine, alkyl nitrites, nitroso compounds or other compounds which inhibit polymer formation if the reactants or products are polymerizable.

The alkaline material used in the process of this invention can be any alkaline material which is capable of effecting a dehydrohalogenation by reaction with a halogenated compound in aqueous media. Alkali metal hydroxides are preferred in the carrying out of the process of this invention. Sodium hydroxide is particularly preferred because of its ready availability. Other hydroxides which can be used include potassium hydroxide, lithium hydroxide, rubidium hydroxide and cesium hydroxide. Alkaline earth metal hydroxides such as calcium and barium hydroxides can also be used.

The hydroxide is preferably used as an aqueous solution and the concentration of hydroxide in the solution may vary over a wide range, for example, from about 2% up to a saturated solution. The sulfonium catalysts are most effective at alkali metal hydroxide concentrations maintained from about 15% up to a saturated solution.

The mole ratio of hydroxide to halo-compound can be as low as about 0.5:1. The optimum mole ratio of reactants to use will vary with the effectiveness of the sulfonium compound being employed as catalyst and the reactivity of the compound being dehydrohalogenated.

Higher mole ratios are needed with the less active catalysts. The upper limit is not critical. In general, there is no advantage in using mole ratios above 20:1.

The process of this invention is generally applicable to the dehydrohalogenation of halogenated aliphatic hydrocarbons containing at least two carbon atoms and at least one hydrogen atom and is particularly useful for the preparation of chloroprene from 3,4-dichloro-1-butene and preparation of 2,3-dichloro-1,3-butadiene from 2,3,4-trichloro-1-butene or 1,2,3,4-tetrachlorobutane. Representative halogenated aliphatic hydrocarbons which can be dehydrohalogenated include chlorocyclohexene, chlorocyclohexane as well as the corresponding polychlor substituted cyclohexanes and cyclohexenes, tetrachlorobutene, ethyl chloride, dichloroethane, trichloroethane, tetrachloroethane and pentachloroethane, 1,4-dichloro-2-butene, 2-chloro-1,3-butadiene, 1-chloro-1,3-butadiene, propyl chloride, butyl chloride, amyl chloride and the corresponding polychloro analogs of these compounds.

These compounds can be saturated or can contain one or more sites of non-aromatic unsaturation. Preferred are ethylenically unsaturated halogenated hydrocarbons such as 3,4-dichloro-1-butene in which the hydrogen which is to be removed by the dehydrohalogenation reaction is attached to the α-carbon atom relative to the double bond. Normally the latter will involve the splitting off of a single HCl molecule.

The process can be carried out by either a batch or a continuous process. The product formed can be recovered by conventional techniques. For example, in producing chloroprene, the reaction mass can be removed as a liquid, the aqueous and the organic phases can be separated by conventional methods, and the chloroprene can be separated from dichlorobutene by distillation. Other methods will be within the scope of one skilled in the art.

Although the invention is illustrated by the dehydrochlorination of chlorine-containing compounds for convenience and because these are the most readily available halogen compounds, it is equally useful for splitting off hydrogen bromide, hydrogen iodide and hydrogen fluoride from the corresponding bromine-, iodine- and fluorine-containing compounds.

The following examples are representative and illustrate the invention process. All parts, percentages and proportions are by weight unless otherwise indicated.

EXAMPLES 1–11

(A) Preparation and identity of the sulfonium compounds of the table

The sulfonium halides used as catalysts in these examples of the table, column 4, are described below. The formation of the sulfonium compound is confirmed by examination of the infrared spectrum and by checking for the presence of inorganic halide.

(A) Sulfonium iodide prepared by refluxing equimolar amounts of dihexyl sulfide and methyl iodide for 25 hours. The product is a brown solid.

(B) Dodecylethylmethylsulfonium chloride (purchased).

(C) Sulfonium iodide prepared by heating equimolar amounts of dihexyl sulfide and hexadecyl iodide at about 100° C. for 2.5 days. The product is a black semi-solid.

(D) Sulfonium iodide prepared as follows: Equimolar amounts (0.01 M) of dioctadecyl sulfide and methyl iodide are stirred in 50 ml. of methanol at 54° C. for about 48 hours and allowed to stand in a stoppered flask. The solid powder is filtered, washed, and dried in a vacuum oven.

(E) Sulfonium iodide prepared by heating equimolar amounts of dodecyl 2-hydroxyethyl sulfide and methyl iodide at 40–60° C. for 24 hours with stirring.

(B) Dehydrochlorination of 3,4-dichloro-1-butene

The reactor used in the examples of the table is a flask fitted with an agitator, reflux condenser, and an adaptor fitted with a serum cap for withdrawing samples. Air is flushed from the flask with nitrogen, and an atmosphere of nitrogen is maintained in the reactor. The temperature is controlled by a steam bath. Sodium hydroxide solution (saturated with sodium chloride) and a small amount of phenothiazine (about 0.005–0.1% based on dichlorobutene) are put into the flask and brought to reaction temperature. 3,4-dichloro-1-butene containing the catalyst is then introduced into the flask through a stoppered glass joint. At the end of the desired reaction time agitation and temperature control are discontinued. Samples of the organic phase are withdrawn, washed with water and analyzed by vapor phase chromatography. Area percent analyses are converted to mole percent values from predetermined calibrations. The formula for percent conversion of dichlorobutene is:

$$\text{Percent conversion} = \frac{\text{Moles of chloroprene}}{\text{Moles of chloroprene plus moles of unreacted dichlorobutene}} \times 100$$

The 3,4-dichloro-1-butene used is 97–98% pure. Molar amounts are not corrected for impurities. The concentration of sodium hydroxide is based on weight of sodium hydroxide plus weight of water. The concentration given in the table is the concentration of the sodium hydroxide initially charged to the reactor. Percentage of catalyst is based on the weight of dichlorobutene (DCB). The table summarizes the various experiments and the results including comparison runs without catalyst.

Similarly effective results, as achieved in the preceding representative examples, are obtained on use of corresponding sulfonium compounds as heretofore described. Additional specific sulfonium compound catalysts that can be substituted in the preceding examples to achieve substantially the same results include the following:

Dioctylmethylsulfonium iodide
Dodecylbis(2-hydroxyethyl)sulfonium chloride
Cetyl(2-hydroxyethyl)methylsulfonium iodide.

TABLE

| Catalyst | Catalyst conc., percent | NaOH conc., percent | Mole ratio, NaOH/DCB | Time, min. | Temp., °C. | Conversion, percent |
|---|---|---|---|---|---|---|
| Example: | | | | | | |
| 1........ A........ | 1 | 50 | 10 | 30 | 60 | 31.4 |
| 2........ B........ | 1 | ᵃ20 | 1.1 | 30 | 60 | 57.6 |
| 3........ B........ | 1 | 50 | 10 | 10 | 25 | 99.4 |
| 4........ B........ | 5 | 50 | 10 | 30 | 60 | 99.2 |
| 5........ C........ | 10 | 50 | 10 | 30 | 25 | 27.9 |
| 6........ D........ | 1 | 20 | 1.1 | 30 | 25 | 13.2 |
| 7........ D........ | 1 | 50 | 10 | 30 | 25 | 52.0 |
| 8........ E........ | 10 | 20 | 1.1 | 30 | 25 | 21.9 |
| 9........ E........ | 10 | 50 | 10 | 30 | 25 | 99.8 |
| 10........ E........ | 1 | 50 | 10 | 30 | 0 | 44.5 |
| 11........ E........ | 10 | 50 | 10 | 30 | 0 | 98.4 |
| Comparison. None..... | 0 | 20 | 1.1 | 30 | 60 | 5.6 |
| Do..........do..... | 0 | 50 | 10 | 30 | 60 | 2.5 |

ᵃ Not saturated with sodium chloride.

The embodiments of the invention in which an exclusive property or privilege is claimed are as follows:

1. In a process for dehydrochlorinating a chlorinated aliphatic hydrocarbon selected from the group consisting of 3,4-dichloro-1-butene; 2,3,4-trichloro-1-butene; and 1,2,3,4-tetrachlorobutane, by reacting said chlorinated hydrocarbon with an aqueous solution of an inorganic alkaline material, the improvement of carrying out the process in the presence of from about 0.5 to about 15% by weight, based on the weight of said chlorinated hydrocarbon, of a sulfonium compound having the structure: $RR'R''S^+X^-$ wherein the R's are organic radicals no more than two of which are aromatic, and R, R' and R'' are selected from methyl, hexyl, dodecyl, ethyl, hexadecyl, octadecyl, 2-hydroxyethyl, p-dodecylbenzyl, cyclohexyl, isooctyl, benzyl, cetyl, o-tolyl, or 1,6-hexamethylene radicals, or two R's together with the sulfonium sulfur form a tetrahydrothiophenium ring, and $X^-$ is an anion selected from the group consisting of chloride, iodide, bromide and the methyl sulfate ion.

2. The process of claim 1 wherein the inorganic alkaline material is an alkali metal hydroxide.

3. The process of claim 1 wherein the inorganic alkaline material is sodium hydroxide.

4. The process of claim 1 wherein said sulfonium compound catalyst is present in an amount of from about 1 to 10%.

5. The process of claim 1 wherein said sulfonium compound is dodecylethylmethylsulfonium chloride.

6. The process of claim 1 wherein said sulfonium compound is dodecyl(2-hydroxyethyl)methylsulfonium iodide.

7. The process of claim 1 wherein said halogenated hydrocarbon is 3,4-dichloro-1-butene.

8. The process of claim 7 carried out at a temperature within the range of from about 10° to about 50° C.

References Cited
UNITED STATES PATENTS

| | | | |
|---|---|---|---|
| 3,514,496 | 5/1970 | Mallan et al. | 260—655 |
| 2,999,888 | 9/1961 | Crocker et al. | 260—655 |

BERNARD HELFIN, Primary Examiner

J. A. BOSKA, Assistant Examiner

U.S. Cl. X.R.

260—654 D